United States Patent [19]

Tsuchiya et al.

[11] Patent Number: 4,823,111

[45] Date of Patent: Apr. 18, 1989

[54] LANDMARK HIERARCHY METHOD FOR ROUTING SIGNALS IN A COMMUNICATIONS NETWORK

[75] Inventors: Paul F. Tsuchiya, Washington, D.C.; W. Worth Kirkman, Fairfax, Va.

[73] Assignee: The Mitre Corporation, Bedford, Mass.

[21] Appl. No.: 158,915

[22] Filed: Feb. 22, 1988

[51] Int. Cl.[4] .................. H04Q 9/00; H04Q 11/04
[52] U.S. Cl. .................. 340/825.050; 340/825.020; 370/16; 370/60; 370/58
[58] Field of Search .............. 340/825.03, 825.04, 340/825.51, 825.02, 825.05; 370/58, 60, 94, 16, 85, 86, 88; 178/2.0

[56] References Cited

U.S. PATENT DOCUMENTS

| | | | |
|---|---|---|---|
| 4,071,908 | 1/1978 | Brophy et al. | 178/2 C |
| 4,287,592 | 9/1981 | Paulish et al. | 370/88 |
| 4,345,326 | 8/1982 | Dieudonne et al. | 370/58 |
| 4,701,756 | 10/1987 | Burr | 340/825.02 |
| 4,736,363 | 4/1988 | Aubin et al. | 370/94 |
| 4,745,593 | 5/1988 | Stewart | 370/60 |
| 4,747,100 | 5/1988 | Roach et al. | 370/86 |

OTHER PUBLICATIONS

Distributed Match–Making for Processes in Computer Networks, Association for Computing Machinery, 1985, pp. 261-271, Sape J. Mullender et al.

Primary Examiner—Donald J. Yusko

[57] ABSTRACT

A hierarchy of landmarks is established for the nodes in the network. Each node is assigned at least one hierarchy level designation and has a corresponding radius. An address is assigned to each of the nodes, the address including components representing landmarks wherein each landmark represented by the address component is within the radius of the landmark represented by the next lower address component. Each node maintains a routing table for routing entries to landmarks within the radii of which a node resides. A source node chooses a path toward the highest level landmark represented by the address components of a destination node until the path reaches a node within the radius of the landmark represented by the next lower level address component. This procedure is repeated for the remaining address components.

3 Claims, 4 Drawing Sheets

LEGEND

□ Network Node

◄---- Landmark Radius

◄——— Path

1: $r_i/d_i = 3$, $D = 5.19 \log_2 N$, $R = 4.4 N^{.33}$
2: $r_i/d_i = 3$, $D = 2.07 \log_2 N$, $R = 3.7 N^{.38}$
3: $r_i/d_i = 4$, $D = 5.19 \log_2 N$, $R = 3.4 N^{.42}$
4: $r_i/d_i = 4$, $D = 2.07 \log_2 N$, $R = 2.9 N^{.48}$
5: $r_i/d_i = 7$, $D = 5.19 \log_2 N$, $R = 2.9 N^{.54}$
6: $r_i/d_i = 7$, $D = 2.07 \log_2 N$, $R = 2.3 N^{.62}$

LANDMARK HIERARCHY METHOD FOR ROUTING SIGNALS IN A COMMUNICATIONS NETWORK

BACKGROUND OF THE INVENTION

This invention relates to a landmark hierarchy method for routing signals in a communications network.

Switching nodes in computer and other communications networks execute routing functions to deliver data from source to destination. These routing functions involve (1) the storage of routing tables (memory overhead), (2) the exchange of routing updates with other nodes (link overhead), and (3) some set of algorithms to compute the routing table entries (CPU overhead). If the routing structure of the network is non-hierarchical, that is, every node maintains a routing entry for every other node in the network, then the overhead caused by the routing function is at best O(N), N being the number of nodes in the network.

As networks grow to many thousands of nodes, the routing overhead can consume an unacceptable percentage of network resources. To overcome this problem, a hierarchical routing structure may be used which reduces the routing overhead. The penalty paid for reduced overhead is increased path length, the amount of which depends on the diameter and node degree of the network, but which is typically small. The telephone network is a well known example of a hierarchical routing structure.

Until now, only one hierarchical routing structure, the area (or cluster) hierarchy, has been developed. This routing structure has resulted in a very limited set of design alternatives for large network routing schemes. One of the problems with the area hierarchy is that it is very difficult to manage dynamically. That is, it is difficult to adjust the area hierarchy in response to topological changes in a distributed, dynamic fashion. In particular, problems arise in situations where a previously connected area is no longer connected, causing nodes to be unreachable by the routing algorithms even though there are physical paths to those nodes. This is referred to as an area partition, or simply, partition. The problem of managing partitions when they occur infrequently has been solved. This solution is adequate for stable networks but not in networks where the topologies may not be stable. A full solution to the problem of dynamic management of a area hierarchy is very difficult and has not yet been achieved in practice.

Figure 1:
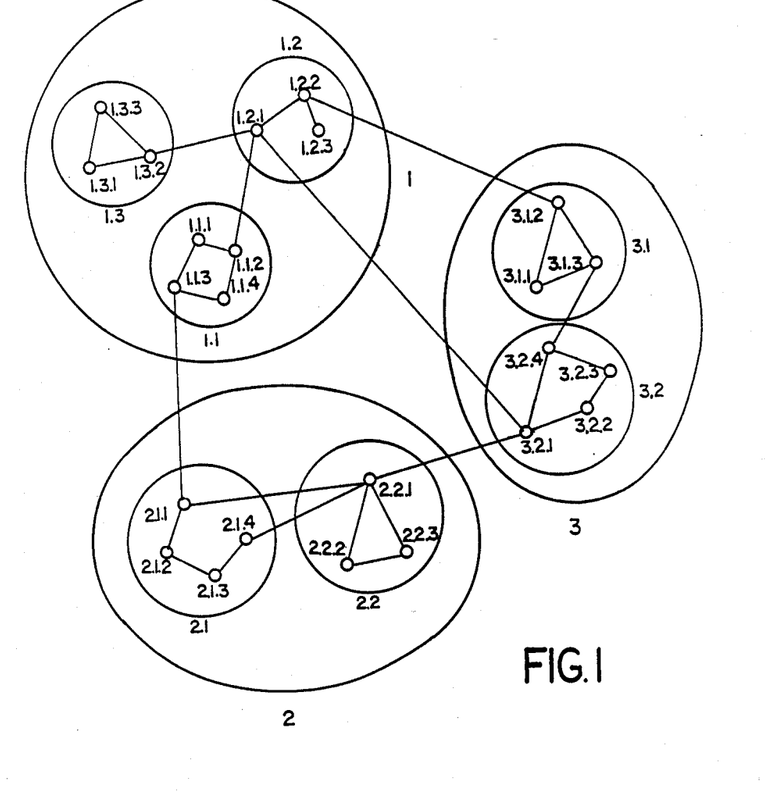
FIG. 1 is a schematic representation of an area hierarchy.

The area hierarchy approach is illustrated in FIG. 1 which shows a computer network of arbitrary physical topology, that is, the topology does not have an obvious physical structure to it such as a hierarchy, ring, etc. An area hierarchy has been overlaid on the network of FIG. 1. This hierarchy is created by logically grouping nodes into areas, grouping areas into super-areas, and so on.

To route a message in an area hierarchy, a node examines the address of the destination node (the telephone number is a well-known example of such an address), determines which area the node is in, and routes the message to that area. Nodes in that area then further route the message to a subarea, and so on until the message reaches its destination. This approach allows nodes outside an area to view the area as a single entity. The result is that only one entry is required in that node's routing table to route to several nodes in another area. For instance, in FIG. 1, node 2.1.1 views nodes 2.2.1, 2.2.2, and 2.2.3 as a single entity, namely, 2.2, which results in a savings of three to one in memory usage (for the table entries) and in link usage (for the updates required to maintain that entry).

As stated above, the penalty paid for this savings is increased path length. Using mathematical analysis it can be shown that, using the area hierarchy, routing overhead of no less than $HN^{1/H}$, where H is the number of hierarchy levels, and N is the number of nodes, can be achieved. Simulation results on a 200-node network produce path lengths of 5% to 15% greater than the shortest path, and routing table sizes of forty or more nodes.

SUMMARY OF THE INVENTION

The landmark hierarchy method for routing signals in a network establishes a hierarchy of landmarks among the nodes. Each node has at least one hierarchy level designation and a corresponding radius. Addresses are assigned to each node made up of address components representing landmarks wherein each landmark represented by the address component is within the radius of the landmark represented by the next lower address component. Each node in the network includes a routing table which includes routing entries to landmarks within the radii of which a node resides. A path is chosen toward the highest level landmark represented by the address components until the path reaches a node within the radius of the landmark represented by the next lower level address component and this procedure is repeated for the remaining address components so that a path leads from a source node to a destination node.

The routing overhead and increased path length for the landmark hierarchy technique disclosed herein are similar to area hierarchies. The landmark hierarchy, however, will be easier to manage dynamically than the area hierarchy. Thus, the landmark hierarchy should significantly improve the robustness of large communications networks.

DESCRIPTION OF THE PREFERRED EMBODIMENT

Whereas an area is a group of nodes all of which have a routing table entry for each other, a landmark vicinity is the group of nodes within the landmark radius, all of which have a routing table entry for a single node, namely, the landmark. The landmark, then, is at the center of this group of nodes, and every node r hops away (r is the radius) from the landmark has a routing table entry for that landmark. A hierarchy of landmarks is formed by having all nodes be landmarks with small radii, a portion of those nodes be landmarks with larger radii, portions of those with still larger radii, and so on until there are a few nodes network wide whose radii cover the whole network. Whereas in the area hierarchy, a node is addressed by its membership in areas, a node in a landmark hierarchy is addressed by its proximity to landmarks.

Figure 2:
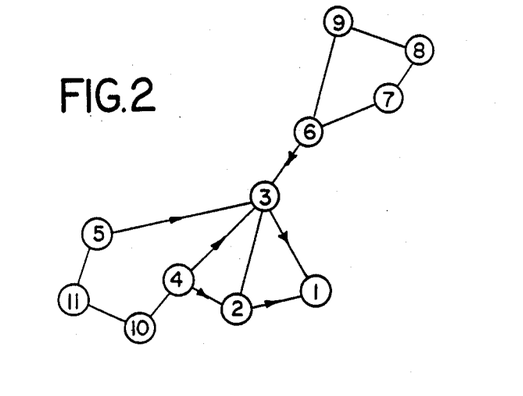
FIG. 2 is a schematic representation of a network illustrating the concept of landmarks.

As an example, consider node 1 in the network of FIG. 2. Nodes 2 through 6 have routing entries for node 1 (as indicated by the arrowheads) and are therefore able to forward packets addressed for node 1 to node 1. Nodes 7 through 11 do not contain routing entries for node 1. Therefore, node 1 is a landmark which can be seen by all nodes within a distance of two hops. Node 1 is therefore referred to as a landmark of radius 2. In general, a node for which all nodes within r hops contain a routing entry is a landmark of radius r.

Next, let us consider a hierarchy built from landmarks. The nomenclature $LM_i$ refers to a landmark of hierarchy level i, i=0 being the lowest level, and i=H being the highest level. Throughout this specification, the term i is reserved to mean a hierarcy level. The nomenclature $LM_i[id]$ refers to a specific $LM_i$ with label id, called the landmark ID. Each $LM_i[id]$ has a corresponding radius $r_i[id]$. In the landmark hierarchy, every node in a network is a landmark $LM_0[id]$ of some small radius $r_0[id]$. Some subset of $LM_0[id]$'s are $LM_1[id]$'s with radius $r_1[id]$, and with $r_1[id]$ almost always greater than $r_0[id]$, such that there is at least one $LM_1[id]$ within $r_0[id]$ hops of each $LM_0[id]$. Likewise, a subset of the $LM_1[id]$'s are $LM_2[id]$'s, with $r_2[id]$ almost always greater than $r_1[id]$, such that there is at least one $LM_2[id]$ within $r_1[id]$ hops of each $LM_1[id]$. These iterations continue until one node is an $LM_i[id]$ with an $r_i[id]$, with $r_i[id] \geq D$, D being the diameter of the network. This is the root landmark.

Figure 3:
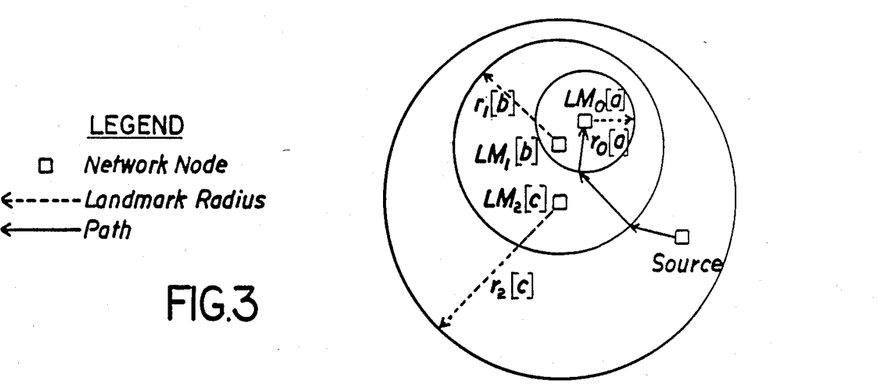
FIG. 3 is a schematic illustration of a landmark hierarchy.

FIG. 3 illustrates the landmark hierarchy by showing a portion of a network. This is a two-dimensional representation (meaning that only nodes drawn very close to each other will share a link). For simplicity, only four of the nodes are shown and no links are shown. The dotted arrows and circle indicate the radius of the landmarks; that is, the vicinity within which nodes contain routing entries for that landmark. For instance, every node within the circle defined by $r_1[b]$ has an entry for, and can route to, $LM_1[b]$. Since nodes may be landmarks at several levels, a node may have several landmark IDs, one for each level. Again, for simplicity, the nodes in FIG. 3 are labeled only with the landmark IDs which are pertinent to the examples herein.

Each node in the network keeps a table of the next hop on the shortest path to each Landmark it has routing entries for. Each node will therefore have entries for every $LM_0[id]$ within a radius of $r_0[id]$, every $LM_1[id]$ within a radius of $r_1[id]$, and so on.

Since every node is an $LM_0$, and since every node has entries for every $LM_0[id]$ within a radius of $r_0[id]$, every node has full knowledge of all the network nodes within the immediate vicinity. Likewise, since a portion of all $LM_0$ are $LM_1$, every node will have knowledge of a portion of the network nodes further away. Similarly, each node will have knowledge of even fewer nodes further still, and so on. The end result is that all nodes have full local information, and increasingly less information further away in all directions. This can be contrasted with the area hierarchy where a node on the border of an area may have full local information in the direction within the border, but no local information in the direction across the border.

In an area hierarchy, the address of a node is a reflection of the area(s) at each hierarchical level in which the node resides. The telephone number is a well-known example of this. In a Landmark hierarchy, the address of a node is a reflection of the Landmark(s) at each hierarchical level which the node is near. The Landmark Address, then, is a series of Landmark IDs: $LM_0[id_a].LM_1[id_b]. \ldots LM_z[id_z]$. As with addresses in the area hierarchy, landmark IDs in the landmark hierarchy only need be locally unique. As long as all level i IDs that share the same level i+1 ID are different, all landmark addresses will be unique.

There are two constraints placed on Landmark Addresses. First, the Landmark represented by each address component must be within the radius of the Landmark represented by the next lower address component. For instance, the node labeled $LM_0[a]$ in FIG. 3 may have the Landmark Address $LM_2[c].LM_1[b].LM_0[a]$. The address of the node labeled $LM_0[a]$ could be $LM_2[c].LM_1[e].LM_0[a]$ if and only if there existed a Landmark $LM_1[e]$ (not shown) which was within the radius of the node labeled $LM_0[a]$. The reason for this constraint will become clear below. Since more than one Landmark may be within the radius of a lower level Landmark, nodes may have a multiplicity of unique addresses. Multiple addresses could be used to improve robustness and provide some traffic splitting.

Now we may consider how routing works in a Landmark Hierarchy. Assume we wish to find a path from the node labeled Source to the node labeled $LM_0[a]$ in FIG. 3. The Landmark Addresses for the node labeled $LM_0[a]$ is $LM_2[c].LM_1[b].LM_0[a]$. The basic approach is the following: Source will look in its routing tables and find an entry for $LM_2[c]$ because Source is within the radius of $LM_2[c]$. In general, a source node will always be able to see at least the highest landmark that it and the destination have in common, i.e., the root landmark. Source will not, however, find entries for either $LM_1[b]$ or $LM_0[a]$, because Source is outside the radius of those Landmarks. Source will choose a path towards $LM_2[c]$. The next node will make the same decision as Source, and the next, until the path reaches a node which is within the radius of $LM_1[b]$. When this node looks in its routing tables, it will find an entry for $LM_1[b]$ as well as for $LM_2[c]$. Since $LM_1[b]$ is finer resolution, the node will choose a path towards $LM_1[b]$. This continues until a node on the path is within the radius of $LM_0[a]$, at which time a path will be chosen directly to $LM_0[a]$. This path is shown as the solid arrow in FIG. 3.

There are two important things to note about this path. First, it is, in general, not the shortest possible path. The shortest path would be represented in FIG. 3 by a straight line directly from Source to $LM_0[a]$. This increase in path length is the penalty paid for the savings in network resources which the Landmark hierarchy provides.

The other thing to note is that often the path does not necessarily go through the Landmarks listed in a Landmark Address. This is more so if the Landmark radius for an $LM_i$ goes well beyond an $LM_{i+1}$, in other words, if the radius overage is large. This is an important reliability consideration in that a Landmark may be heavily congested or down, and yet a usable path may be found using that Landmark (or, more literally, using previous updates received from that Landmark).

Figure 4:
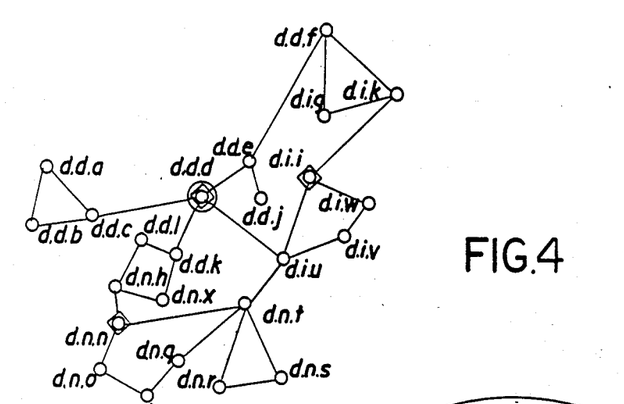
FIG. 4 is an illustration of a landmark routing example.

In order to illustrate better the Landmark Hierarchy, FIG. 4 shows the same network of FIG. 1 with a Landmark Hierarchy rather than an Area Hierarchy. This network has three hierarchical levels. All nodes (small circles) are $LM_0$. $LM_1$ are denoted by a diamond, and $LM_2$ by a large circle. The rightmost address component is the $LM_0[id]$, and is unique for each node in the network. The middle address component is the $LM_1[id]$ and indicates proximity to an $LM_1$, and the leftmost address component is an $LM_2[id]$, indicating proximity to an $LM_2$. All $r_0 = 2$ hops, all $r_1 = 4$ hops, and all $r_2 = 8$ hops.

TABLE 1

| Routing Table for Node g of FIG. 4 | | |
|---|---|---|
| Landmark | Level | Next Hop |
| $LM_2[d]$ | 2 | f |
| $LM_1[i]$ | 1 | k |
| $LM_0[e]$ | 0 | f |
| $LM_0[k]$ | 0 | k |
| $LM_0[f]$ | 0 | f |

Table 1 shows the routing table for Node g in FIG. 4. The length of this table has been optimized by including only one entry per node, even if that node is a Landmark at several different levels. Node g has less than one fourth of the total network nodes in its routing table.

A routing example where Node g (d.i.g.) is routing a message to Node t (d.n.t.) will now be considered. Node g examines Node t's Landmark Address—d.n.t.—and does not find entries for either $LM_0[t]$ or $LM_1[n]$ in its routing table. Node g does, however, have an entry for $LM_2[d]$, and therefore forwards the message towards $LM_2[d]$ via Node f. Node f also does not have entries for $LM_0[t]$, or $LM_1[n]$, and therefore forwards the message towards $LM_2[d]$ via Node e. Node e does have an entry for $LM_1[n]$ (but not $LM_0[t]$), and forwards the message towards $LM_1[n]$ via Node d. Node d does have an entry for $LM_0[t]$, as does Node u, and the message is delivered. The resulting path, g-f-e-d-u-t, is 5 hops, 1 hop longer than the shortest path, g-k-i-u-t.

In what follows, we give a brief analysis of the landmark hierarchy, followed by the results of simulations.

We describe the parameter $r_i$ (radius) as the average distance in hops within which nodes have a routing entry for a Landmark $LM_i$ at hierarchy level i. When written $r_i[id]$, it refers to the radius of a particular Landmark $LM_i[id]$ as discussed above. Note that $r_i[id_i]$ is not necessarily equal to $r_i[id_2]$.

The subscript i always refers to the hierarchical level. There are two special cases of this. The subscript H refers to the highest level. The Landmark at this level is called the root Landmark. The subscript L refers to the lowest level, where the Landmarks are called local Landmarks. The higher levels are denoted by increasing values of i. In other words, if a Landmark is at level i, then its child will be at level i-1.

The superscript g implies that a Landmark is global. In other words, its radius extends to all nodes in the network. For example, $LM_i^g$ is a global Landmark whose radius would be written $r_i^g$.

The notation d generally refers to the distance between two nodes. When written $d_i(id)$, it describes the distance between a node labeled id and its closest level i Landmark $LM_i$. When written $d(x \rightarrow y)$, it refers specifically to the distance from node x to node y. Finally, when written as $d_i$, it refers to the average distance between every node and its closest $LM_i$.

The parameter $T_i$ describes the number of level i Landmarks in a network.

The function $v(x)$ describes the number of nodes within x hops, $0 \leq x \leq D$, of some given node. This function is dependent on the number of nodes in a network N, the average node degree C, and the diameter of the network D. This function typically starts at $v(0) = 1$, exponentially increases as x increases, then tapers off to a linear function of x as x increases further, and finally tapers further approaching N as x approaches D.

The parameter $R_i$ describes the average number of routing table entries in a node for level i Landmarks. In other words, it describes the number of $LM_i$ within $r_i$ hops of a given node.

Finally, the parameter $\hat{P}_i$ refers to the average increase in path length for the Landmark Hierarchy over the shortest path. A value of $\hat{P}_i = 1$ implies that the paths found in the Landmark Hierarchy are the shortest possible. The parameter $\hat{P}$ refers to the average increase in path length overall.

There is a direct relationship between $r_i$, the average $LM_i$ radius, and $d_i$, the average distance from all nodes to their closest $LM_i$. Certainly, if $LM_i$ have large $r_i$, higher level Landmarks can be far away from them, and hence $d_i$ can be large. Conversely, if $r_i$ is small, higher level Landmarks must be closer and $d_i$ will be small. (It is of course possible to have large $r_i$ and small $d_i$. It is not possible, however, to have small $r_i$ and large $d_i$.

There is also a direct relationship between the size of the routing tables $R_i$, the number of Landmarks $T_i$, and the average Landmark radius $r_i$. Clearly, if there are either many $LM_i$ in a network (large $T_i$), or if their $r_i$ are large, then nodes will have more entries in their routing tables.

On the average, every $LM_i$ will have $v(r_i)$ nodes within its Vicinity, and each of those nodes will have a routing entry for that $LM_i$. There will therefore be $T_i v(r_i)$ routing entries in the network, and on the average $$R_i = \frac{T_i v(r_i)}{N} \quad \text{EEa}$$

routing entries in each node for each level i.

There is an inverse relationship between $T_i$, the number of $LM_i$ in a network, and $d_i$. Consider that for each $LM_i$ there are, on the average, $N/T_i$ nodes closer to that $LM_i$ than any other $LM_i$. Then there will exist some $\hat{d}_i$ for which $$v(\hat{d}_i) = \frac{N}{T_i} \quad \text{EEb}$$

Clearly, $\hat{d}_i$ and $d_i$ are related. If the average distance to an $LM_i$ is small, then the average maximum distance from a node to an $LM_i$ must also be small.

Finally, if we combine equations EEa and EEb, $$R_i \simeq \frac{v(r_i)}{v(d_i)} \quad \text{EEc}$$

This shows that routing table sizes are dependent on the radius of the Landmark, and the density of Landmarks in the network.

Figure 5:
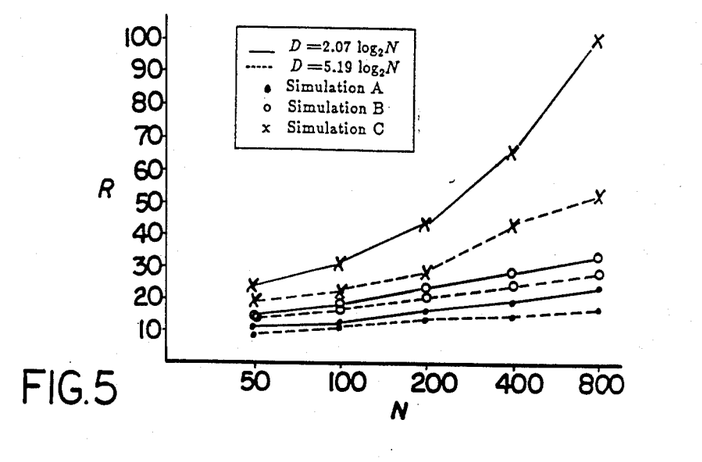
FIG. 5 is a graphical illustration of routing table size for realistic networks.
Figure 6:
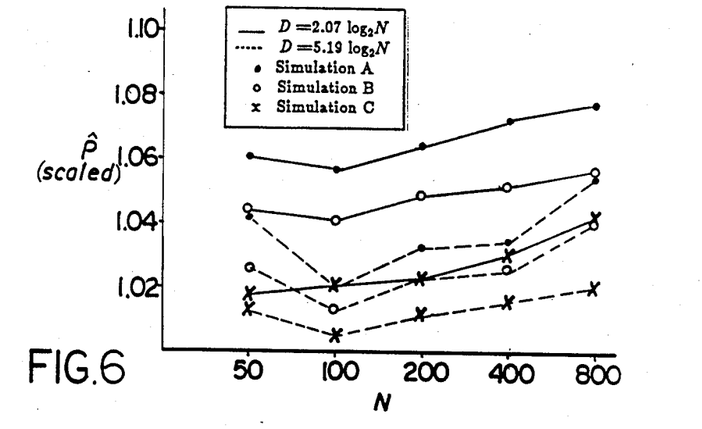
FIG. 6 is a graphical illustration of path lengths for realistic networks and scaled traffic matrix.
Figure 7:
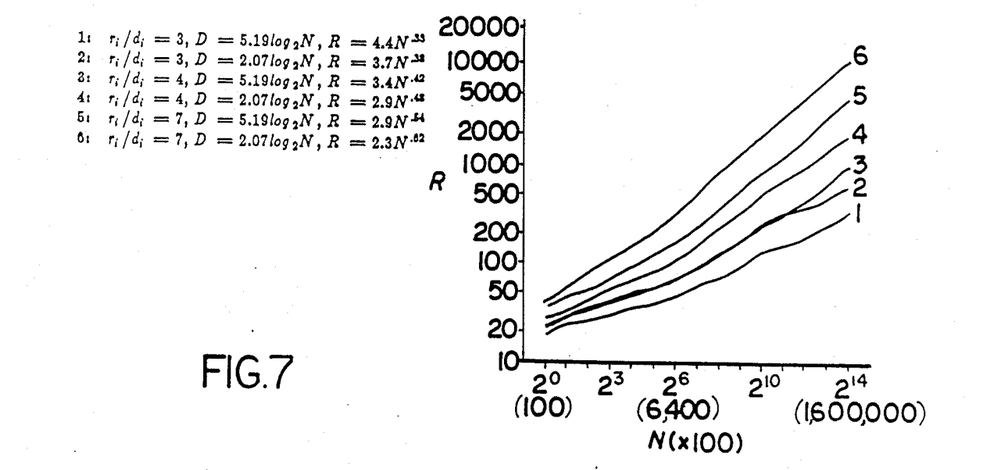
FIG. 7 is a graphical illustration of estimated performance for networks larger than 800 nodes.

FIGS. 5, 6, and 7 show the overall performance of the Landmark Hierarchy. FIGS. 5 and 6 show results for simulations run on networks ranging from 50 to 800 nodes, and with small and large diameters. They show results for three different sets of hierarchy parameters, one which results in large routing tables and small path lengths (Simulation A), one which results in small routing tables and large path lengths (Simulation C), and one which falls in between (Simulation B). FIG. 5 shows the routing table sizes R, and FIG. 6 shows the path length increase $\hat{P}$.

From FIGS. 5 and 6, we see first that both path lengths and routing table sizes are larger for networks with smaller diameters. Second, we see that larger routing table sizes results in smaller path length increases, and vice versa.

FIG. 7 shows estimated routing table sizes for networks ranging in size from 100 to 1,600,000 nodes. We see here that different values of R were achieved by adjusting the value of $r_i/d_i$. Note again that different diameters have an impact on routing table sizes. Here we see the impact of equation EEc. The different diameters impact the function $v(x)$, while the selection of $r_i/d_i$ impacts the value of $R_i$, and subsequently, R.

This ends the basic description of the landmark hierarchy. Note that this description of routing in the landmark hierarchy made several assumptions. First, it assumed that there was some technique for determining which nodes would become which landmarks, and for determining the radii of each landmark. Further, it assumed that each node has some technique for learning its own address. We call this the hierarchy maintenance function. Second, it assumed that there was some technique for distrubuting the correct routing table entries to each node. We call this the routing function. Since nodes have different views of the network, their tables are different. Third, we assume that each node has a method for distributing its own address to other nodes, and for learning the addresses for other nodes with which it wishes to communicate. We call this the name-to-address binding function, or simply the binding function.

The routing and binding functions are endemic to all networking, not just the landmark hierarchy. Anyone skilled in the art is familiar with these functions. For instance, the telephone book is a well-known example of a function for binding names to addresses (where in this case, the address is the telephone number). As such, known techniques for both of these functions apply to their use in the landmark hierarchy. Therefore, it is not necessary or appropriate to include them in this preferred embodiment. Nonetheless, the inventors have described a preferred embodiment of both the routing and binding functions, as well as that of the hierarchy maintenance function, in a published document. The document is: Tsuchiya, P.F., "Landmark Routing: Architecture, Algorithms, and Issues," MTR-87W00174, The Mitre Corporation, McLean, VA, September, 1987. The reader should refer to this document for further information on these functions, and on their use with the landmark hierarchy.

The hierarchy maintenance function, on the other hand, is part and parcel of any practical embodiment of the landmark hierarchy. Therefore, we describe this function next. We do so by first describing its relationship with the routing and binding functions. We then describe the hierarchy maintenance function itself.

The routing function, by interacting with routing functions in other nodes, determines how many hops away another node is, and over which neighbor nodes the other node can be reached. A neighbor node is defined as one that is directly reachable without traversing any intermediate nodes. If the topology changes (i.e., nodes and/or links are added or removed) such that a node becomes closer or further from other nodes, the routing function will learn this, and update the routing table accordingly. Each node that the routing function learns about is a landmark at some level i, and with some radius $r_i[id]$. The routing function provides the hierarchy maintenance function with the current list of landmarks. This list includes the following information:
1. The landmark ID.
2. The address of the landmark.
3. The level of the landmark.
4. The distance, in hops, to that landmark.
5. Whether or not the landmark is global.
6. A list of that landmark's children.
7. Whether or not that landmark is satisfied, in other words, has a parent.

In addition to the information received from this list, the hierarchy maintenance function also receives information directly from other landmarks it has learned about from the routing function. This information is given in the description of the hierarchy maintenace function proper.

The routing function also provides the binding function with the information listed above. In addition, the hierarchy maintenance function provides the binding function with its current landmark address. This information constitutes the complete input required for the operation of the binding function.

We now complete the description of the hierarchy maintenance function.

We have stated that, in order for the Landmark Hierarchy to work, a parent Landmark must be within the radius of one or more of its children. It follows, then, that when a parent is not within the radius of one or more of its children, the hierarchy is broken—routing does not take place for some set of network nodes. To see this, consider FIG. 8, similar to FIG. 3, but with the first level Landmark $LM_{L+1}[b]$ moved outside of the radius of its child $LM_L[a]$. When the message from source destined for $LM_L[a]$ is routed to $LM_{L+1}[b]$, it goes no further, because $LM_{L+1}[b]$ does not know how to route it to $LM_L[a]$. In general, messages addressed for the child (or one of its offspring) whose source is outside of the child's radius will route to the parent, but the parent will not be able to forward the message. We call this condition a partition. In particular, we say that the child Landmark has been partitioned from the parent Landmark.

Note that a partition in the Landmark Hierarchy only affects messages whose source is outside of the radius of the partitioned child, and whose destination is an offspring of the partitioned child. No other source-destination pairs are affected by the partition. This can be favorably compared to a partition in the area hierarchy where any source-destination pair, except that in which both nodes are in the same partition segment, can potentially be affected by the partition. This is because two nodes outside the partitioned area may be attempting to use that area as a transit area.

There are three ways of fixing a Landmark Hierarchy partition. (In this specification, the word partition alone always refers to a Landmark Hierarchy partition.) Only one of the three ways actually involves the creation of additional Landmarks.

Figure 8:
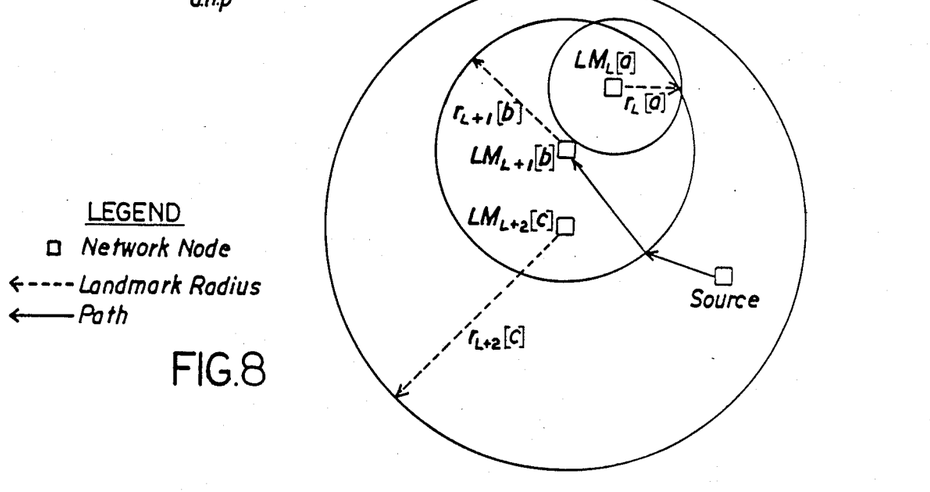
FIG. 8 is a schematic representation of a Landmark hierarchy partition.

The first and simplest way is for the child to increase its radius to again encompass the parent Landmark. This can only be done if the child can still see the parent—in other words, if the child is within the radius of the parent. This will often be the case, such as shown in FIG. 8, because the radius of the parent will typically be substantially larger than that of the child. If the child cannot see its parent, then it has no way of knowing how much to increase its radius. In particular, it has no way of knowing if the parent simply no longer exists. If the parent is a global Landmark, then the child will always have the option of increasing its radius, because it will always be able to see the parent.

The second way for a partitioned child to reestablish the hierarchy is to pick another parent. This will cause all of the offspring of the child to have new addresses. This reassignment of addresses, however, need not interrupt existing traffic or cause a large amount of additional traffic. Obviously, the child cannot pick another parent unless it is within the radius of another Landmark. It is possible, however, to arrange that any Landmark has two potential parents most of the time. Previous research shows that hierarchies constructed such that each child has two parents have acceptable routing table sizes ($O(\sqrt{N})$). Even in this case, it is possible for the child to lose sight of both parents at the same time.

It is interesting to note that the child does not necessarily need to choose another parent which is a peer of its previous parent. In other words, it can pick a parent which is at a higher or at a lower hierarchical level than its previous parent. Care must be taken to prevent two children who have both lost parents (either the same one or different ones) from trying to use each other as parents.

If a child picks a new parent which is at a higher level than its old parent, it has in essence become a higher level Landmark itself. This is third way to handle a partition—create new Landmarks. This must be done when a child sees no potential parents, and so must elevate itself to the position of a higher Landmark. Creating new Landmarks has the effect both of generating new addresses and generating new update traffic and routing table entries. For this reason, creating new Landmarks is generally the most obtrusive of the three approaches to handling partitions.

It is worth noting that the creation or deletion of a Landmark does not necessarily happen because of a partition. In fact, it may more often be the case that the creation or deletion of a Landmark occurs as an adjustment of a non-partitioned hierarchy rather than as a reaction to a partitioned hierarchy in order to decrease the probability of a partition.

We continue the discussion of dynamic hierarchy management by describing how a network can configure the hierarchy from scratch. In other words, we assume that an entire network is powered up at once. Although we do not expect this to happen often (if ever), the same techniques will also apply to patching the more pathological hierarchy partitions, and to configuring a node which has just entered the network. This discussion will also serve to show what the normal non-partitioned structure of the hierarchy should be, which will lead into a discussion of managing the non-partitioned hierarchy. We will then describe how to deal with several classes of hierarchy partitions.

There are only two types of messages required for configuring a Landmark Hierarchy. One message says "I am an $LM_i$, but I have no parent." The other says "I am an $LM_i$, and I have a parent." In addition, there are two sets of static parameters which each Landmark uses to determine whether it may need to become a higher Landmark or not. The two parameters are $d_i^{max}$, the maximum distance which any $LM_i$ can be from an $LM_{i+1}$; and $r_i^{initial}$, the initial radius of an $LM_i$. (The initial radius is generally reduced after the hierarchy is established to optimize routing table sizes.)

When a node becomes an $LM_i$, it determines whether or not it is within $d_i^{max}$ hops of an $LM_{i+1}$ which does not have a full quota of children. If it is, then it is said to be "satisfied", and the closest $LM_{i+1}$ without a full quota of children will become its parent. (There is a network parameter which describes the maximum number of children a Landmark may have. The value of this parameter should be around 5.) If it is not, then either it or some other $LM_i$, within $d_i^{max}$ hops which is not satisfied (that is, has no parent) must become an $LM_{i+1}$. This can be done using a simple so-called bully election, where the $LM_i$ with the highest Landmark Priority number is the winner. (The Landmark Priority Number can be a globally unique identifier, a randomly chosen number, or a pre-determined priority number.)

Note that each $LM_i$ may have a different notion of which $LM_i$ are participating in the election. For instance, consider four non-satisfied Landmarks, $LM_i[a]$, $LM_i[b]$, $LM_i[c]$, and $LM_i[d]$. Assume that $LM_i[a]$, $LM_i[b]$, and $LM_i[c]$ are within $d_i^{max}$ hops of each other, and that $LM_i[b]$, $LM_i[c]$, and $LM_i[d]$ are within $d_i^{max}$ hops of each other, but that $LM_i[a]$ and $LM_i[d]$ are greater than $d_i^{max}$ hops from each other. In this case, $LM_i[a]$ will see itself running an election with $LM_i[b]$ and $LM_i[c]$, but $LM_i[b]$ will see itself running an election with $LM_i[a]$, $LM_i[c]$, and $LM_i[d]$.

This, however, is not a problem. Assume that $LM_i[d]$ has the highest Landmark Priority Number. Then $LM_i[d]$ will win its election and become an $LM_{i+1}$, $LM_i[b]$ and $LM_i[c]$ will become satisfied, and drop out of the election with $LM_i[a]$. Then $LM_i[a]$ will win its election (by default) and become an $LM_{i+1}$.

Now we can describe the configuration process from power-up. We assume that every node can establish communications with its immediate neighbors—that is, those nodes with which it shares a link. For the sake of discussion, we also assume that the values of $d_i^{max}$ and $r_i^{initial}$ increase in powers of 2 as i increases, and that $d_1^{max}=1$, and $r_L^{initial}=2$. Initially, all nodes become $LM_L$'s, and send out Landmark Updates LU (L,2,U), which state that the $LM_L$ has no parents. (The nomenclature for a Landmark Update is LU (level, radius, satisfied/unsatisfied). LU(L,2,U) indicates that the update is from a level L Landmark, should travel a distance of 2 hops (because $r_L^{initial}=2$), and is unsatisfied.) The LU's also contain the Landmark Priority Number. Each node runs an election with the unsatisfied $LM_L$'s within $d_i^{max}=1$ hop. The winners of these elections become $LM_1$'s, and send out Unsatisfied Landmark Updates LU(1,4,U). The losers send out Satisfied Landmark Updates LU(L,2,S), thus pulling themselves out of any remaining elections. (In addition, the losers will choose an address for level L. They will also adjust their radii based on the distance to their parents and possibly their children, if any.)

Next, the $LM_1$'s run elections with other $LM_1$'s within $d_1^{max}$ hops of each other. These elections take place only after an appropriate delay, or after each $LM_1$ has heard from a certain number of other $LM_1$'s. This prevents an $LM_i$ from prematurely electing itself a winner before other $LM_{i-1}$ have had a chance to become $LM_i$. These elections will result in a set of $LM_2$'s, which will in turn run elections with each other. This will continue until, at some high level, there will be only one Landmark. When this happens, the hierarchy is complete.

The resulting structure is H levels of hierarchy, with a single Landmark at the highest level, and all nodes as Landmarks at the lowest level. The parent/child relationships form a single tree, with the highest Landmark at the top. The addresses of the nodes reflect this tree structure. Each parent will have some number of children ranging from 1 (itself) to many. In previous research using the parameters of $d_i^{max}$ and $r_i^{initial}$ given above, it was found that each parent had on the average between 2 and 3 children. The variance on the number of children was not measured. However, since the algorithm for configuring the hierarchy results in a fairly uniform distribution of Landmarks, it is unlikely that the variance is very large.

Once the network is configured as described above, it is non-partitioned. However, it is not necessarily in an "optimal" configuration. We do not mean optimal in terms of efficiency measures such as routing table sizes or path lengths. Previous research shows that there is considerable flexibility in the assignment of Landmarks with regards to these efficiency measures. It is the radii which most strongly effect efficiency. What we mean by optimal is that the configuration is such that a partition, especially one affecting a large number of nodes, is the least likely. In addition, changes in the network topology, while they may not always cause a partition, may make the network more likely to experience a partition by moving Landmarks further from their parents. Therefore, the hierarchy should adjust itself to a more optimal configuration while in a non-partitioned state. Hereinbelow, we describe this adjustment process.

One of the problems with the non-partitioned hierarchy described above is that there is a single global Landmark at the top. This means that all addresses are dependent on that Landmark. If that Landmark dies, or somehow changes its address, every node in the network will be affected. To alleviate this problem, we make some number of Landmarks $T^g$ at some high level of the hierarchy global by increasing their radii to infinity. The level at which this occurs is the level i such that $T_i > T^g$ and $T_{i+1} < T^g$.

The levels of hierarchy above this level will still exist, and will still be reflected in the Landmark Updates sent. It is necessary to keep these levels of hierarchy to deal with the problem of merging networks. However, it will not be necessary to encode these levels in the Landmark Addresses.

In what follows, we describe the technique to (1) determine the number of global Landmarks $T^g$, and (2) determine which Landmarks at which level become global.

Each node partitions its routing table into two parts, the routing entries due to the global landmarks $R^g$, and all others $R^{rest}$. A global network average of $p^{real} = R^g/R$ is calculated by having each node tell its parent its own value, the parent telling its parent an aggregate value for its offspring, and so on. Each global landmark then provides the aggregate value for its offspring to all nodes, and each node can then calculate a network-wide average based on the values from each global node.

Each node is configured with a target value $P_{mid}$ for $R^g/R$, and a target range $P_{min} \leq P_{mid} \leq P_{max}$. Typical vales are $P_{mid} = .4$, $P_{min} = .3$, and $P_{max} = .5$. If $p^{real} < p_{min}$ or $p^{real} > P_{max}$, then there are too few or too many global landmarks respectively. If this is the case, then the number of global landmarks that need to be added or deleted is calculated by every node as:

$$T^{g\Delta} = R^g - \frac{p_{mid} R^{rest}}{(1 - p_{mid})} \qquad \text{EEd}$$

The value $T^{g\Delta}$ is the surplus of global landmarks. If it is positive, then $T^{G\Delta}$ global landmarks must be removed. If it is negative, then $T^{G\Delta}$ global landmarks must be added. Using the values of $p_{mid}$, $p_{min}$, and $p_{max}$ results in routing table sizes of 2 to 3 times larger than if there were only one global landmark.

Given that it is known how many more or less global Landmarks are needed at a given time, it is a fairly simple matter to determine which Landmarks should either become global, or stop being global. We do this by defining an ordering of Landmarks from those in the highest hierarchy level to those in the lowest. In other words, no level i Landmarks will become global until all level i+1 Landmarks are global. Within a hierarchy level the ordering is as follows (assume that all level i+1 Landmarks are global, that there are n level i+1 Landmarks, and that we wish to describe the ordering of the level i Landmarks). The first one is the child with the highest address of the children of the level i+1 Landmark with the highest address of the level i+1 Landmarks. The 2nd one is the child with the highest address of the children of the level i+1 Landmark with the 2nd highest address of the level i+1 Landmarks. The nth one is the child with the highest address of the children of the level i+1 Landmark with the nth highest (in this case, the lowest) address of the level i+1 Landmarks. The n+1th one is the child with the 2nd highest address of the children of the level i+1 Landmark with the highest address of the level i+1 Landmarks, and so on.

Any Landmark can very easily determine where it is in the ordering. All Landmarks know of all global Landmarks, and all Landmarks know of their own siblings. Therefore, a Landmark, say level i, knows how it is ordered among its siblings, knows the ordering of the level i+1 Landmarks, and knows how many of the children of the level i+1 global Landmarks have become global Landmarks.

The idea behind adjusting Landmarks in a non-partitioned hierarchy is to create a uniform distribution of Landmarks, both in terms of the placement of level i Landmarks with respect to each other, and in terms of the number of children Landmarks have. This uniform distribution minimizes the possibility of a hierarchy partition by keeping Landmarks close to their parents. The goal here is for Landmark adjustments to be as simple as possible. We define three types of adjustments:

1. An $LM_i$ adopts a new $LM_{i+1}$ parent.
2. An $LM_{i+1}$ demotes itself to an $LM_i$.
3. An $LM_i$ is promoted to an $LM_{i+1}$ via the election process.

Since each of these adjustments is made when the hierarchy is intact and routing is successfully taking place, the adjustments can be made in a leisurely and controlled fashion. When a Landmark changes roles, getting a new address for itself and its offspring in the process, it will typically keep its old role for a period of time. This allows the binding function to take place gradually over that period of time, thus avoiding a surge of address binding traffic. It also allows adjustments which result from a previous adjustment to occur over a period of time.

When an $LM_i$ finds itself closer to some $LM_{i+1}$ than it is to its own parent, it should adopt the new $LM_{i+1}$. This has the effect of reducing the routing table sizes because the $LM_i$ can reduce its radius. More important, however, is that it reduces the potential for the $LM_i$ to be partitioned from its parent. This is for two reasons. First, since the $LM_i$ would be closer to its parent, there are a smaller number of intermediate nodes and links which could crash, thus potentially causing the $LM_i$ to be partitioned. Second, since the $LM_i$ is closer, its parent's radius would typically extend further past the $LM_i$ thus making it less likely that the $LM_i$ could lose track of its parent in the face of topology changes.

In adopting a new parent, a Landmark must be careful of several things. First, it must avoid oscillating between the old parent and the new parent. This could happen if a node or link was periodically crashing and coming up again, causing the distance to an $LM_{i+1}$ to change between two values such that first it was farther than the distance to another $LM_{i+1}$, and then it was closer. One way we can reduce the possibility of this kind of oscillation is with hysteresis. That is, we do not allow an $LM_i$ to switch to a new parent unless the new parent is closer than the old parent by some number of hops. This, however, does not prevent all oscillations. It also prevents the $LM_i$ from adopting a better parent in many cases. Another way to reduce the possibility of oscillation is to wait a period of time before adopting a new parent. If this time period is longer than that of the oscillation, then the new parent will not be chosen. If the time period is shorter, the oscillation will occur, but not very quickly. An appropriate solution to this problem seems to be to use a small hysteresis value (on the order of one hop), and a moderate time delay (several minutes at least).

Second, we wish to avoid the situation where two or more $LM_i$ try to adopt the same $LM_{i+1}$ at the same time, thus causing the $LM_{i+1}$ to have too many children, which in turn results in one or more of the $LM_i$ having to adopt yet another parent (or run an election). This can be avoided with a simple three-way handshake. When an $LM_i$ sees that an $LM_{i+1}$ has room for more children, and wishes to adopt it, it communicates this to the $LM_{i+1}$. If the $LM_{i+1}$ has no outstanding adoptions in progress, it reserves a space for the $LM_i$, and tells the $LM_i$ that it may be adopted. Since the $LM_{i+1}$ must advertise its new child to all of its other children (partly for the purpose of address binding, and partly for the purpose of choosing address values), the response can be in the form of a Landmark Update. If the $LM_{i+1}$ has another $LM_i$ trying to adopt it which would exhaust its quota of children, then the $LM_{i+1}$ can disallow the new adoption. In this case, the $LM_i$ must either find another $LM_{i+1}$ to adopt, or run an election (even if the election is only with itself).

Once an $LM_i$ has been accepted by its new parent, it needs to send out a Landmark Update indicating its new address. This allows its offspring to start the process of rebinding their addresses. It also allows its new parent to see that the adoption has taken place (the third part of a three-way handshake). The $LM_i$ should keep the old parent for a period of time while it and its offspring are rebinding their addresses. In other words, they will have two valid addresses for a period of time.

There are two situations where an $LM_i$ will demote itself to an $LM_{i-1}$ or lower. First, the $LM_i$ will demote itself if it has no children (other than itself, of course). It can lose its children either because its children adopted new parents, or because the children crashed or were separated from it by topology changes. This demotion has a fairly small impact on address changes because it has fewer offspring since it has only one child (itself). Before an $LM_i$ demotes itself, it must adopt a new $LM_i$ parent. If it cannot, then it will not demote itself.

The other reason that an $LM_i$ will demote itself is because it is too close to another $LM_i$. This can happen because of the addition of links and/or nodes. We need another parameter, $d_i^{min}$, which gives the minimum distance which two $LM_i$ can be from each other. In this case, the $LM_i$ will demote itself as many levels as necessary to satisfy $d_i^{min}$ for all levels of i. Clearly, only one $LM_i$ should demote itself—the one with the smallest Landmark Priority Number for instance.

This demotion causes more network perturbation than the no-children demotion, because it affects more offspring. The $LM_i$ demoting itself can expect to have one or more children. These children must find new parents, either through adoption or election. Again, the demoting $LM_i$ will keep its old status for a period of time to smooth the transition.

The only way that an $LM_i$ can become an $LM_{i+1}$ is through election. Elections occur any time a Landmark is not satisfied—it has no valid parent within $d_i^{max}$ hops. This can happen when the network is non-partitioned, because an $LM_i$ can temporarily have an $LM_{i+1}$ for a parent which is more than $d_i^{max}$ hops away—for instance, if a recent topology change caused the parent to become further away. It can also happen when a parent is going through the process of demoting itself. In other words, a partition is imminent.

Now that we have discussed how to manage the non-partitioned hierarchy, we can discuss how to manage the partitioned hierarchy. Two points need to be made. First, the purpose of the non-partitioned hierarchy management is to maneuver the hierarchy into a position where partitions are the least likely—essentially, to optimize the hierarchy. Second, having non-partitioned hierarchy management means that all we need to do in partitioned hierarchy management is to get the hierarchy to a state where it is not partitioned. Since communication is not taking place for a set of nodes while the hierarchy is partitioned, partition repair should be rapid. Once the partition is repaired, adjustment of the hierarchy can occur at a more leisurely, more stable pace.

There are three types of partitions:

1. The child can still see its parent, but the parent can no longer see the child.

2. The child can no longer see its parent, but can see another Landmark at the same level as the parent with space for children.

3. The child can see no valid Landmarks at the level of its parent.

The first two cases are easy to handle. In the first case, the child simply increases its radius to encompass the parent. In this case, no address change has taken place. Depending on the situation, the non-partitioned hierarchy management techniques may cause a subsequent adjustment of Landmarks.

In the second case, the child adopts a new parent, and adjusts its radius accordingly. This is similar to the non-partitioned adoption, except that in this case, there may be no overlap during which the child has two addresses. Therefore, address binding will have to be expedited.

These first two cases will constitute the large majority of partitions. In the simulations, there were very few cases where a node had only 1 Landmark at some hierarchy level in its routing tables, and therefore would not have other parents to choose from in case of a partition. Further, most of these cases were for the networks where the radii were as small as they could possibly be, which is not a normal or recommended mode of operation.

In the third situation, elections must take place to reestablish the hierarchy above the Landmark which sees no parents. The elections start at the level at which the Landmark can see some peers (it is possible that the $LM_i$ cannot see any $LM_{i-1}$, $LM_{i-2}$, and so on). The election continues until all Landmarks are satisfied, that is, have valid parents.

Probably the most difficult hierarchy management problem is dealing with two or more networks or network segments which merge. The main problem in this case is that there will most likely be some number of global Landmarks which have the same address component. Another problem is that there will be a surplus of global Landmarks.

We categorize merging networks into two types. Those in which one network is significantly smaller than the other, and those in which the networks are roughly the same size. The critical point here is that if one network is smaller than the other, then it will have fewer hierarchical levels, and in particular, its global Landmarks will be at a lower level than the larger network's global Landmarks. If the networks are roughly the same size, then their global Landmarks will be at the same level.

When a large and a small network merge, the global Landmarks from the small one below the level of those from the large one will be superfluous, and will need to go away. We wish to do this with a minimum of perturbations, especially to the large network portion. When the two networks are roughly the same size, then there will probably still be too many global Landmarks, but global Landmarks from both sides will need to disappear. In both cases, there will be some number of address collisions (where global Landmarks from each network poriton have the same address).

We need two simple additional rules to deal with merging networks. First, a node should never forward the LU for a global Landmark if the level of the global Landmark is below that which the node expects to see. From the algorithm that determines which Landmark is next scheduled to either become global or stop being global, every node knows the level at which the next global Landmark will be chosen. If no node forwards LUs for global Landmarks below what it considers the proper level, then the global LUs from the small portion will not be seen in the large portion, thus saving the large portion from any additional traffic and computation.

The other rule is that, when a node sees a global LU with the same address as a current one, but from a different node, it passes the LU on and processes it normally, but does not add the global Landmark to its routing table. This way, global Landmarks from the other merging network portion will not be confused with global Landmarks from this network portion until the colliding addresses are resolved. Since the LUs are passed on, however, the colliding Landmarks will hear about each other and resolve the addresses. When the addresses are resolved, the new global Landmark can be added to the routing table.

Except for these two rules, the existing techniques for managing the hierarchy will suffice to merge two networks. In particular, when two networks merge, the root Landmark from the smaller portion will suddenly see peers and possibly higher level Landmarks, and will know that it must continue the election process. It can then either adopt a parent, or run an election, depending on whether it is satisfied or not. If two equal size networks are joined, then the two root Landmarks can run an election between them.

What is claimed is:

1. Method for routing signals in a communications network having plural nodes comprising:
    establishing a hierarchy of landmarks among the nodes, each node having at least one hierarchy level designation and corresponding radius;
    assigning one or more addresses to each of the nodes, the address comprising address components representing landmarks; wherein each landmark represented by the address component is within the radius of the landmark represented by the next lower address component;
    establishing a routing table for each node in the network, each node's routing table including routing entries to landmarks within the radii of which a node resides;
    using the routing table to route signals by choosing a path toward the highest level visible landmark represented by the address components until the path reaches a node within the radius of the landmark represented by the next lower level address component; and repeating this procedure for the remaining address components until the signal reaches its destination.

2. The method of claim 1 further including re-establishing the hierarchy of landmarks, the addresses, and the routing tables as a result of node connectivity changes.

3. Communications network comprising:
    a plurality of nodes, each node having at least one hierarchy level designation and corresponding radius, each node further including at least one address, the address comprising address components representing landmarks wherein each landmark represented by the address component is within the radius of the landmark represented by the next lower address component;
    apparatus for establishing and storing a routing table for each node in the network, each node's routing table including routing entries to landmarks within the radii of which a node resides;
    computing apparatus utilizing the routing table to route signals by choosing a path toward the highest level visible landmark represented by the address components until the path reaches a node within the radius of the landmark represented by the next lower level address component and repeating this procedure for the remaining address components until the signal reaches its destination.

* * * * *